US012768380B2

(12) United States Patent
Mochizuki et al.

(10) Patent No.: US 12,768,380 B2
(45) Date of Patent: Oct. 20, 2026

(54) COMPONENT ASSEMBLY STRUCTURE

(71) Applicant: YAZAKI CORPORATION, Tokyo (JP)

(72) Inventors: Yasufumi Mochizuki, Makinohara (JP); Hiroyuki Ooishi, Shimada (JP); Keiji Matsushita, Shimada (JP)

(73) Assignee: YAZAKI CORPORATION, Tokyo (JP)

( * ) Notice: Subject to any disclaimer, the term of this patent is extended or adjusted under 35 U.S.C. 154(b) by 244 days.

(21) Appl. No.: 18/582,658

(22) Filed: Feb. 21, 2024

(65) Prior Publication Data

US 2024/0318677 A1 Sep. 26, 2024

(30) Foreign Application Priority Data

Mar. 20, 2023 (JP) ................................ 2023-043825

(51) Int. Cl.
*F16B 5/06* (2006.01)
*F16B 19/02* (2006.01)

(52) U.S. Cl.
CPC ............ *F16B 5/0664* (2013.01); *F16B 19/02* (2013.01)

(58) Field of Classification Search
None
See application file for complete search history.

(56) References Cited

U.S. PATENT DOCUMENTS 686,454 A * 11/1901 Hearn ..................... F16B 19/02 278/65
8,196,271 B2 * 6/2012 Balsells .................. F16B 21/06 24/581.1
8,336,922 B2 * 12/2012 Tiberghien .............. F16L 39/00 137/594
10,724,188 B2 * 7/2020 Berning ................ E01C 23/088
11,415,158 B2 * 8/2022 Schneider ................. F16B 3/06
11,572,026 B2 * 2/2023 Wang .................... F16B 5/0657
12,331,774 B2 * 6/2025 Heinrichs ............. F16B 21/075

FOREIGN PATENT DOCUMENTS

JP H10-311746 A 11/1998
JP H11-271102 A 10/1999
JP 2004-148011 A 5/2004

* cited by examiner

*Primary Examiner* — Matthew R Mcmahon
(74) *Attorney, Agent, or Firm* — KENEALY VAIDYA LLP

(57) ABSTRACT

The component assembly structure includes a component to be assembled in which a positioning pin is provided on a base, a first component with a first hole to be fitted to the positioning pin, and a second component with a second hole to be fitted to the positioning pin. The positioning pin includes a first shaft portion in the side on the base and a second shaft portion, having a diameter smaller than that of the first shaft portion, in the side on the tip end. The first component is positioned on the component to be assembled by fitting the first hole to the first shaft portion. The second component is positioned on the component to be assembled by fitting the second hole to the second shaft portion.

4 Claims, 6 Drawing Sheets

COMPONENT ASSEMBLY STRUCTURE

CROSS-REFERENCE TO RELATED APPLICATION(S)

The present application claims priority to and incorporates by reference the entire contents of Japanese Patent Application No. 2023-043825 filed in Japan on Mar. 20, 2023.

BACKGROUND OF THE INVENTION

1. Field of the Invention

The present invention relates to a component assembly structure.

2. Description of the Related Art

For example, a display apparatus for a vehicle includes a housing, a display, a dial plate, a light guide plate, and a facing member. The display apparatus for a vehicle is assembled by assembling the display and dial plate to the housing and fitting holes in the light guide plate and holes in the facing member to pins provided in the housing. Such component assembly structures are described, for example, in Japanese Patent Application Laid-open No. H11-271102 and Japanese Patent Application Laid-open No. 2004-148011. In Japanese Patent Application Laid-open No. H11-271102, a projection provided on a support column of a meter case is penetrated into a hole in a light guide plate and a hole in a dial plate, and thus the light guide plate and the dial plate are positioned with respect to the support column. In Japanese Patent Application Laid-open No. 2004-148011, a projection is provided on a counter, and a leaf spring nut is press-fitted into the projection while the projection is inserted into a hole 3*a* of an L metal fitting 3, and thus the L metal fitting is secured to the projection.

In Japanese Patent Application Laid-open No. H11-271102, the hole of the light guide plate and the hole of the dial plate are fitted and assembled in that order to the projection of the support column. In this case, the outer diameter of the projection of the support column has the same dimension in the axial direction, and thus the outer peripheral surface of the projection may be scraped and damaged when the hole of the light guide plate is fitted to the projection of the support column. Then, the hole of the dial plate cannot be fitted properly to the projection of the support column, or positioned accurately due to play. In Japanese Patent Application Laid-open No. 2004-148011, the L metal fitting inserted into the projection of the counter is secured by the leaf spring nut. In this case, the projection of the counter has a conical trapezoidal shape, which makes accurate positioning of the L metal fitting difficult.

SUMMARY OF THE INVENTION

The present invention has been made under such circumstances as described above and aims at providing a component assembly structure for improving the positioning accuracy of components.

To achieve the object of the present invention, a component assembly structure according to one aspect of the present invention includes a component to be assembled in which a positioning pin is provided on a base; a first component with a first hole to be fitted to the positioning pin; and a second component with a second hole to be fitted to the positioning pin, wherein the positioning pin includes a first shaft portion in a side on the base and a second shaft portion, having a diameter smaller than that of the first shaft portion, in a side on a tip end, the first component is positioned on the component to be assembled by fitting the first hole to the first shaft portion, and the second component is positioned on the component to be assembled by fitting the second hole to the second shaft portion.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

An embodiment according to the present invention will now be described in detail with reference to the drawings. The present invention should not be limited to the embodiment. The constituents in the embodiment include elements that are replaceable or easily conceivable by those skilled in the art or elements substantially the same as those described in the embodiment.

In the following description, among a first direction, a second direction, and a third direction crossing with each other, the first direction is referred to as a first in-plane direction X, the second direction as a second in-plane direction Y, and the third direction as an axial center direction Z. The first in-plane direction X, the second in-plane direction Y, and the axial center direction Z are generally perpendicular to each other. The axial center direction Z is the direction of assembling the component to be assembled, the first component, and the second component.

EMBODIMENTS

Components

Figure 1:
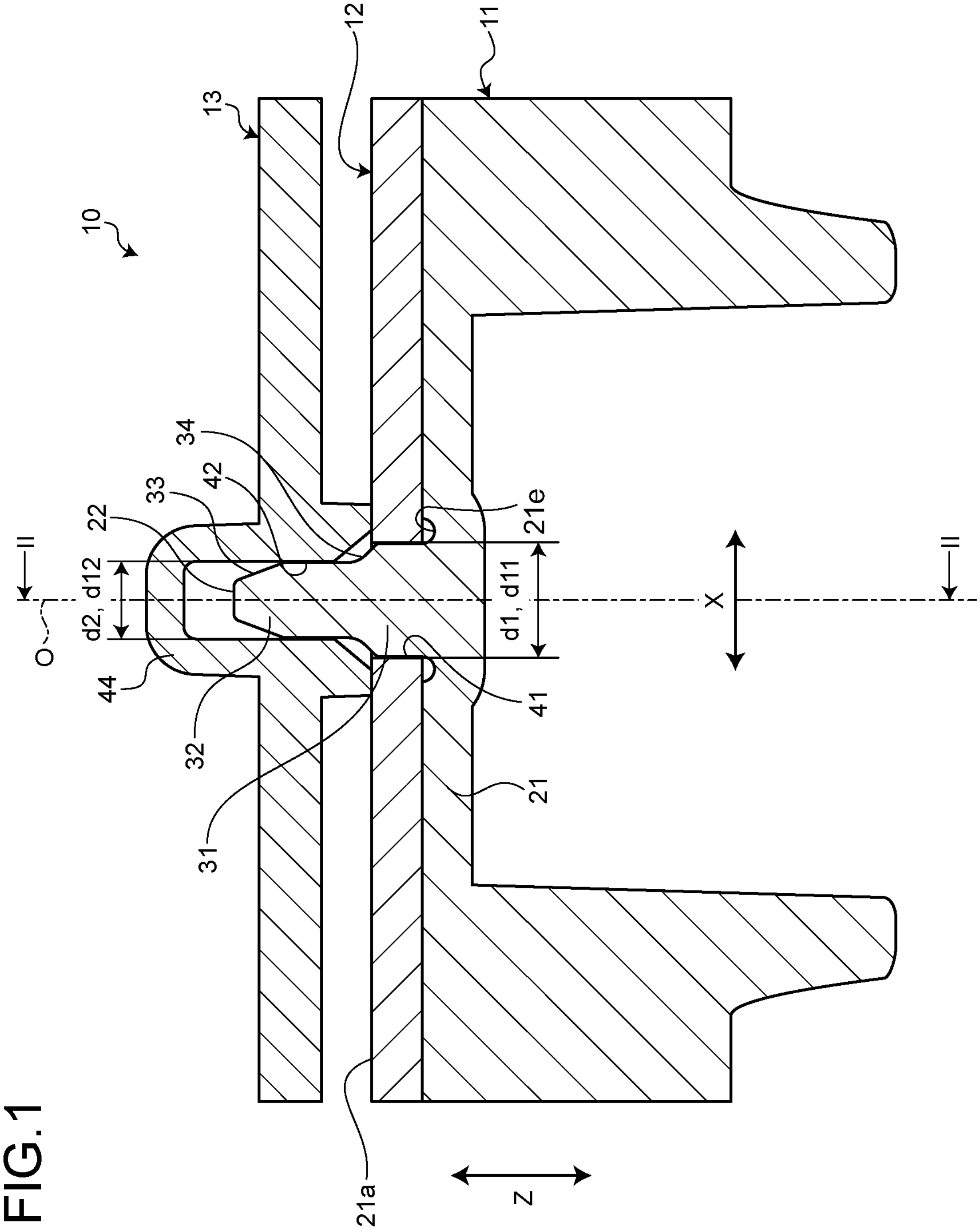
FIG. 1 is a sectional view of the component assembly structure according to the present embodiment.
Figure 2:
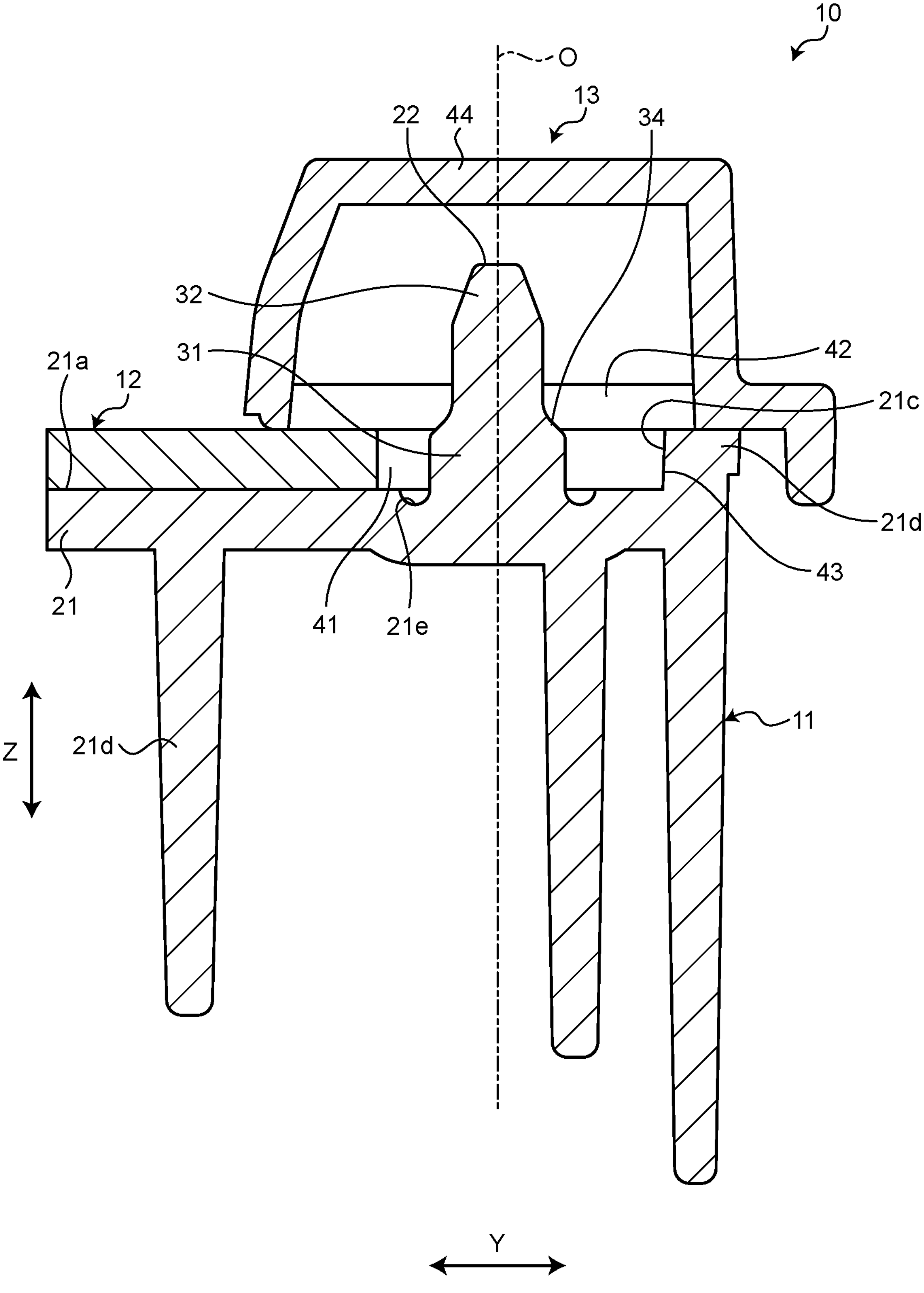
FIG. 2 is a sectional view taken along II-II of FIG. 1 of the component assembly structure.

FIG. 1 is a sectional view of the component assembly structure according to the present embodiment, and FIG. 2 is a sectional view taken along II-II of FIG. 1 of the component assembly structure. The component assembly structure of the present embodiment is applied to an in-vehicle instrument 10.

As illustrated in FIGS. 1 and 2, the in-vehicle instrument 10 includes a component to be assembled 11, a first component 12, and a second component 13. When the component assembly structure of the present embodiment is applied to the in-vehicle instrument 10, a case corresponds to the component to be assembled 11, a cover glass corresponds to the first component 12, and a front cover (facing member) corresponds to the second component 13. A component to be applied to the first component 12 is a component to which an introducing shape (tapered shape) cannot be attached, such as a router component or a press component, generally a member made of a material harder than the material of a positioning pin. A component to be applied to the second component 13 is an intermediate component requiring high positioning accuracy.

The component to be assembled 11 includes a base 21 and a positioning pin 22. The base 21 is integrally provided with the positioning pin 22 on the surface side of a mounting surface 21*a*. The positioning pin 22 is provided along the axial center direction Z and has a cylindrical shape with the axial center O. The positioning pin 22 includes a first shaft portion 31 and a second shaft portion 32. The first shaft portion 31 has the same outer diameter along the axial direction (axial center direction Z) and the second shaft portion 32 has the same outer diameter along the axial direction (axial center direction Z). The first shaft portion 31 has an outer diameter d1, and the second shaft portion 32 has an outer diameter d2. The outer diameter d2 of the second shaft portion 32 is smaller than the outer diameter d1 of the first shaft portion 31. Therefore, the outer diameter d1>the outer diameter d2 is established in the first shaft portion 31 and the second shaft portion 32.

The first component 12 includes a first hole 41. The first hole 41 has a notched shape opening on one side in the second in-plane direction Y, or may have a long hole shape not opening on one side in the second in-plane direction Y or a perfect circle shape. The first hole 41 fits the first shaft portion 31 in the positioning pin 22. The first hole 41 has an inner diameter d11, which is a dimension in the first in-plane direction X. The inner diameter d11 of the first hole 41 has the same dimension as, or a dimension slightly smaller than, the outer diameter d1 of the first shaft portion 31 in the positioning pin 22. That is, the first component 12 is assembled such that the first hole 41 is fitted (or press-fitted) to the first shaft portion 31 and is positioned on the component to be assembled 11.

The second component 13 includes a second hole 42. The second hole 42 has a long hole shape in the second in-plane direction Y, or may have a perfect circle shape. The second hole 42 fits the second shaft portion 32 in the positioning pin 22. The second hole 42 has an inner diameter d12, which is a dimension in the first in-plane direction X. The inner diameter d12 of the second hole 42 has the same dimension as, or a dimension slightly smaller than, the outer diameter d2 of the second shaft portion 32 in the positioning pin 22. Therefore, the second component 13 is assembled such that the second hole 42 is fitted (or press-fitted) to the second shaft portion 32 and is positioned on the component to be assembled 11.

That is, in the first component 12, the inner diameter d11 of the first hole 41 is the same as the outer diameter d1 of the first shaft portion 31 of the positioning pin 22 in the component to be assembled 11, but larger than the outer diameter d2 of the second shaft portion 32 of the positioning pin 22 in the component to be assembled 11.

Component to be Assembled

Figure 3:
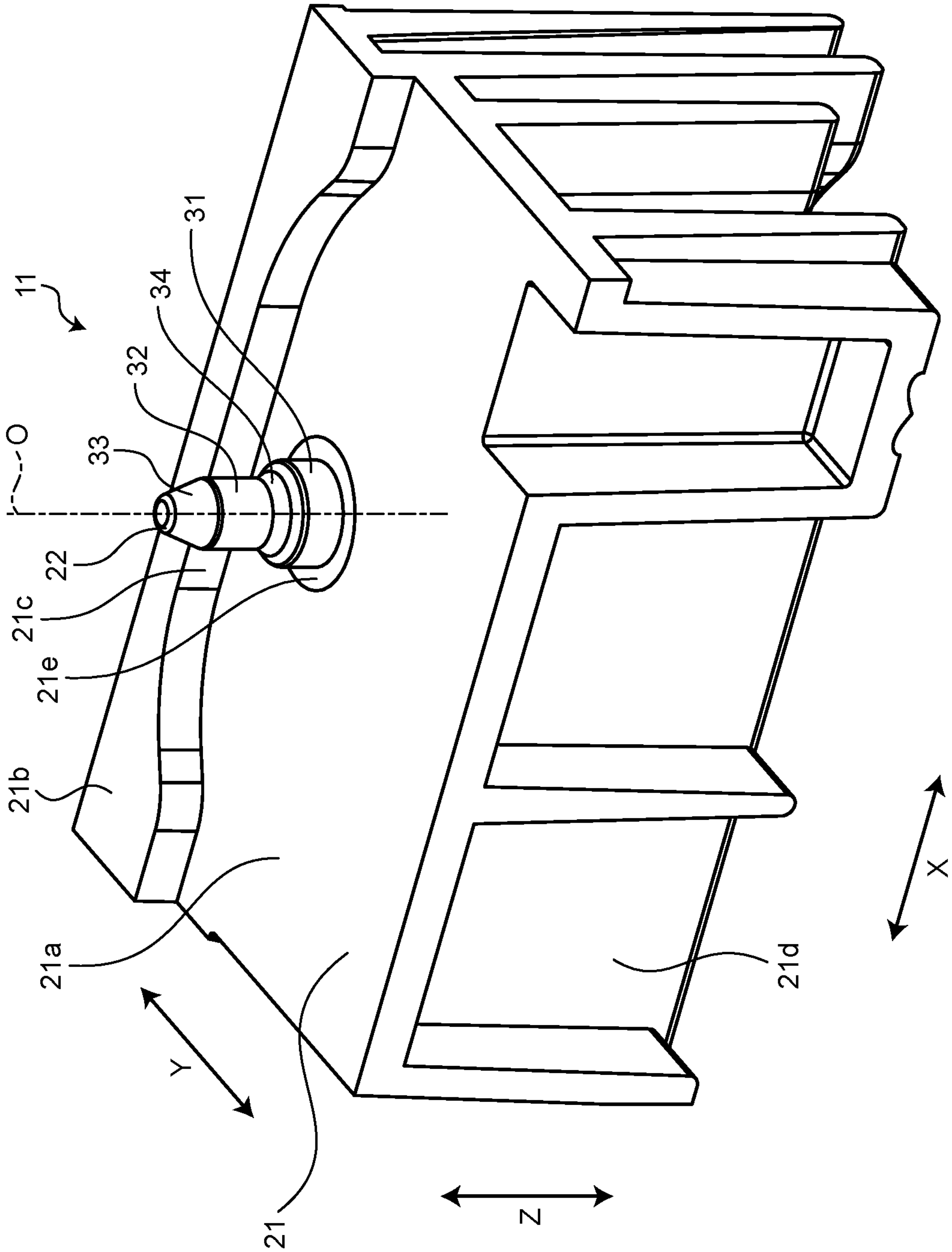
FIG. 3 is a perspective view of a component to be assembled.

FIG. 3 is a perspective view of the component to be assembled.

As illustrated in FIG. 3, the component to be assembled 11 includes the base 21 and the positioning pin 22. The base 21 has a long plate shape along the first in-plane direction X and the second in-plane direction Y. The base 21 is provided with the mounting surface 21*a*, which has a planar shape along the first in-plane direction X and the second in-plane direction Y on one side in the axial center direction Z. The base 21 is also provided with a step 21*b*, which is on one side in the second in-plane direction Y and on one side in the axial center direction Z. The step 21*b* is provided along the first in-plane direction X on the mounting surface 21*a*, and an end surface 21*c* along the axial center direction Z is formed between the step 21*b* and the mounting surface 21*a*. The base 21 is also provided with a frame 21*d* having a square frame shape on the other side in the axial center direction Z.

The positioning pin 22 includes the first shaft portion 31 and the second shaft portion 32. The first shaft portion 31 is provided in the side on the base 21, and the second shaft portion 32 is provided in the side on the tip end. The positioning pin 22 is provided with a tip end 33 having a conical trapezoidal shape that tapers to the tip end of the first shaft portion 31. The positioning pin 22 is also provided with an inclined portion 34 having a conical trapezoidal shape between the first shaft portion 31 and the second shaft portion 32. The base 21 is provided with a recess 21*e* having a ring shape around the positioning pin 22 on the mounting surface 21*a*.

First Component

Figure 4:
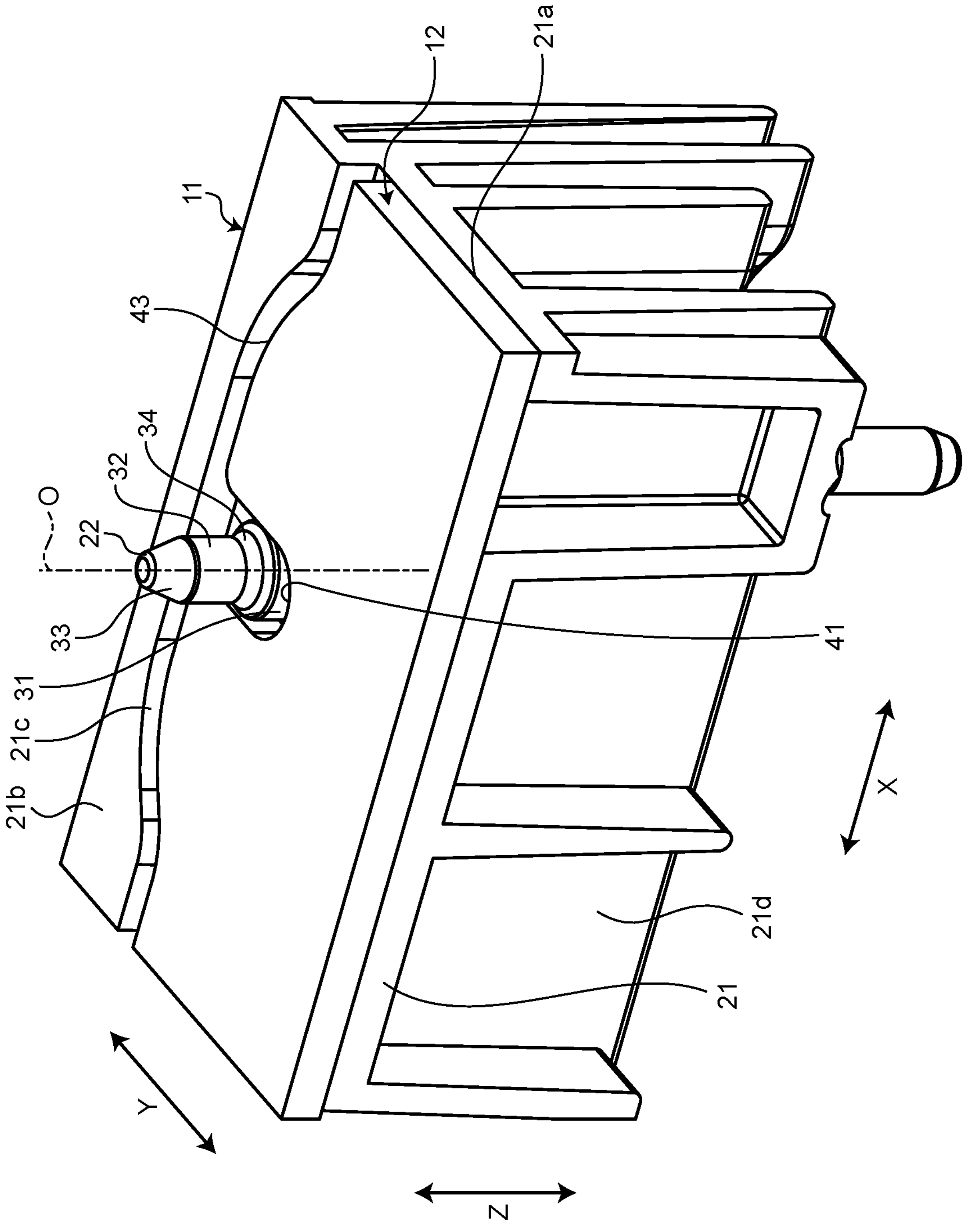
FIG. 4 is a perspective view of a state where a first component has been assembled to the component to be assembled.

FIG. 4 is a perspective view of a state where the first component has been assembled to the component to be assembled.

As illustrated in FIG. 4, the first component 12 has a plate shape, and is provided with the first hole 41. The first hole 41 has a notched shape opening from an approximate center of the first component 12 to one side in the second in-plane direction Y. The first component 12 includes an end surface 43 on one side in the second in-plane direction Y, which has a shape almost similar to the end surface 21*c* of the step 21*b* in the component to be assembled 11. The first hole 41 fits the first shaft portion 31 in the positioning pin 22. The first component 12 is positioned in the first in-plane direction X with respect to the component to be assembled 11 by fitting the first hole 41 to the first shaft portion 31. The first component 12 is also positioned in the second in-plane direction Y with respect to the component to be assembled 11 by abutting the end surface of the first component 12 to the end surface 21*c* of the step 21*b*.

Second Component

As illustrated in FIGS. 1 and 2, the second component 13 has a plate shape, and is provided with the second hole 42. The second hole 42 has a long hole shape, which is long from an approximate center of the second component 13 along the second in-plane direction Y. The second component 13 is provided with a covering 44 on one side in the axial center direction Z in the second hole 42. The covering 44 has a long shape along the second in-plane direction Y, as is similar to the second hole 42. The second hole 42 fits the second shaft portion 32 in the positioning pin 22. The second component 13 is positioned in the first in-plane direction X with respect to the component to be assembled 11 by fitting the second hole 42 to the second shaft portion 32.

Method for Assembling Components

Figure 5:
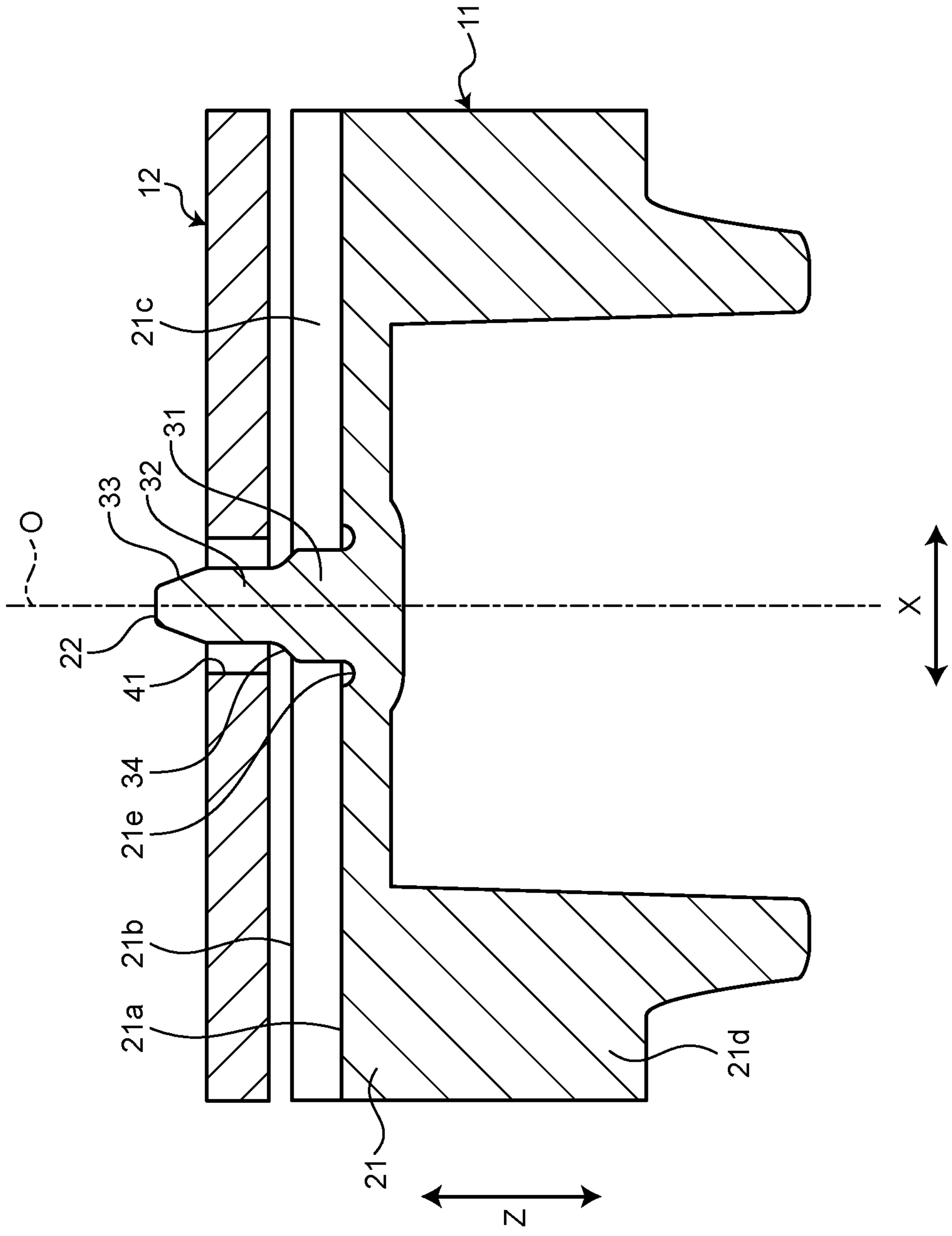
FIG. 5 is a sectional view of how the first component is assembled to the component to be assembled.
Figure 6:
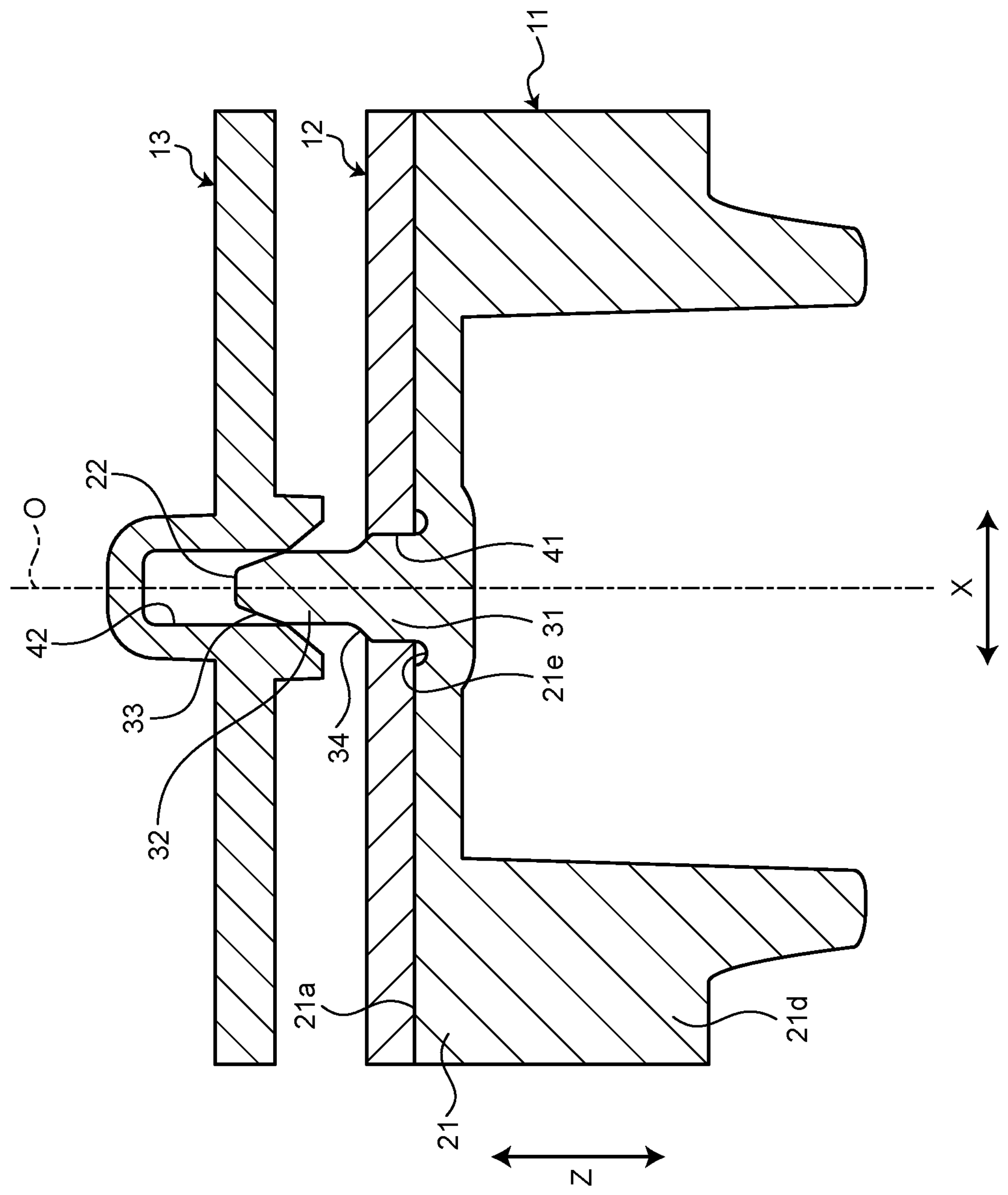
FIG. 6 is a sectional view of how a second component is assembled to the component to be assembled.

FIG. 5 is a sectional view of how the first component is assembled to the component to be assembled, and FIG. 6 is a sectional view of how the second component is assembled to the component to be assembled.

As illustrated in FIG. 5, first, the first component 12 is assembled to the component to be assembled 11. That is, the first hole 41 of the first component 12 is fitted to the first shaft portion 31 of the positioning pin 22 in the component to be assembled 11. In this case, the inner diameter d11 of the first hole 41 of the first component 12 is larger than the outer diameter d2 of the second shaft portion 32 of the component to be assembled 11. That is, when the first hole 41 of the first component 12 is fitted to the first shaft portion 31 of the positioning pin 22, a gap is generated between the inner peripheral surface of the first hole 41 and the outer peripheral surface of the second shaft portion 32. Therefore, the inner peripheral surface of the first hole 41 of the first component 12 does not strongly contact the outer peripheral surface of the second shaft portion 32, and the outer peripheral surface of the first shaft portion 31 is not scraped and damaged by the first hole 41. The first hole 41 of the first component 12 is thus properly fitted to the first shaft portion 31 of the positioning pin 22 in the component to be assembled 11. The first component 12 is assembled to the component to be assembled 11 such that positioning in the first in-plane direction X is performed with respect to the component to be assembled 11 by fitting the first hole 41 to the first shaft portion 31.

As illustrated in FIG. 6, the second component 13 is then assembled to the component to be assembled 11. That is, the second hole 42 of the second component 13 is fitted to the second shaft portion 32 of the positioning pin 22 in the component to be assembled 11. In this case, the first shaft portion 31 of the positioning pin 22 has no damage in the outer peripheral surface, and thus the second hole 42 of the second component 13 is properly fitted to the second shaft portion 32 of the positioning pin 22 in the component to be assembled 11. The second component 13 is assembled to the component to be assembled 11 such that positioning in the first in-plane direction X is performed with respect to the component to be assembled 11 by fitting the second hole 42 to the second shaft portion 32.

If the first hole 41 of the first component 12 and the second hole 42 of the second component 13 each have a perfect circle shape, the first component 12 and the second component 13 are positioned also in the second in-plane direction Y with respect to the component to be assembled 11.

As described above, the component assembly structure (in-vehicle instrument 10) according to the present embodiment includes the component to be assembled 11 in which the positioning pin 22 is provided on the base 21, the first component 12 with the first hole 41 to be fitted to the positioning pin 22, and the second component 13 with the second hole 42 to be fitted to the positioning pin 22, in which the positioning pin 22 includes the first shaft portion 31 in the side on the base 21 and the second shaft portion 32, having a diameter smaller than that of the first shaft portion 31, in the side on the tip end, the first component 12 is positioned on the component to be assembled 11 by fitting the first hole 41 to the first shaft portion 31, and the second component 13 is positioned on the component to be assembled 11 by fitting the second hole 42 to the second shaft portion 32.

According to the component assembly structure of the present embodiment, provision of the first shaft portion 31 having a large diameter and the second shaft portion 32 having a small diameter on the positioning pin 22 of the component to be assembled 11 causes the inner diameter d11 of the first hole 41 of the first component 12 to be larger than the outer diameter d2 of the second shaft portion 32 of the positioning pin 22 in the component to be assembled 11. Then, when the first hole 41 of the first component 12 is fitted to the first shaft portion 31, damage in the outer surface of the second shaft portion 32 due to contact with the first hole 41 of the first component 12 is prevented, and the second hole 42 of the second component 13 can be properly fitted to the second shaft portion 32 to position the second component 13 on the component to be assembled 11, resulting in an improvement of accurate positioning of the components.

In the component assembly structure according to the present embodiment, the first shaft portion 31 and the second shaft portion 32 each have the same outer diameters along the axial direction. Therefore, the first hole 41 of the first component 12 can be properly fitted to the first shaft portion 31 of the positioning pin 22, and the second hole 42 of the second component 13 can be properly fitted to the second shaft portion 32 of the positioning pin 22. In addition, since the first component 12 is fitted to the first shaft portion 31 and the second component 13 is fitted to the second shaft portion 32, the play can be individually adjusted in the first component 12 and the second component 13.

In the component assembly structure according to the present embodiment, the inclined portion 34 having a conical trapezoidal shape is provided between the first shaft portion 31 and the second shaft portion 32. Therefore, the second hole 42 of the second component 13 is guided by the inclined portion 34, thereby smoothly fitted to the second shaft portion 32 of the positioning pin 22.

The above-described component assembly structure of the present embodiment is applicable, for example, to a display apparatus for a vehicle. In this case, the housing corresponds to the component to be assembled, the light guide plate corresponds to the first component, and the dial plate corresponds to the second component.

The component assembly structure according to the embodiment of the present invention is not limited to the above-described embodiment, and various modifications can be made within the scope described in the claims.

The component assembly structure according to the present embodiment may be configured by combining the constituent elements of the embodiments and reference examples described above as appropriate.

The component assembly structure according to the present embodiment has the following effect: by providing the first shaft portion having a large diameter and the second shaft portion having a small diameter on the positioning pin of the component to be assembled, the first hole of the first component is prevented from damaging the outer surface of the second shaft portion when the first hole of the first component is fitted to the first shaft portion, and the second hole of the second component can be properly fitted to the second shaft portion to position the second component on the component to be assembled, resulting in an improvement of accurate positioning of the components.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A component assembly structure comprising:

a component to be assembled in which a positioning pin is provided on a base, the base including a first side and a second side and a step formed along the second side of the base, the step having a top surface;

a first component with a first hole to be fitted to the positioning pin, the first component having a top surface; and a second component with a second hole to be fitted to the positioning pin, wherein the positioning pin includes a first shaft portion in a side on the base and a second shaft portion, having a diameter smaller than that of the first shaft portion, in a side on a tip end, the first component is positioned on the component to be assembled by fitting the first hole to the first shaft portion, the second component is positioned on the component to be assembled by fitting the second hole to the second shaft portion, and wherein the top surface of the step is co-planer with the top surface of the first component.

2. The component assembly structure according to claim 1, wherein the first shaft portion and the second shaft portion each have a constant outer diameter along an axial direction of the positioning pin.

3. The component assembly structure according to claim 2, wherein an inclined portion having a conical trapezoidal shape is provided between the first shaft portion and the second shaft portion.

4. The component assembly structure according to claim 1, wherein an inclined portion having a conical trapezoidal shape is provided between the first shaft portion and the second shaft portion.

* * * * *